May 19, 1970     D. A. FLUEGEL     3,513,468
OUTPUT LOGIC FOR DIRECT DIGITAL CONTROL SYSTEM
Filed May 29, 1967     4 Sheets-Sheet 1

INVENTOR.
D.A. FLUEGEL
BY
Young & Quigg
ATTORNEYS

May 19, 1970     D. A. FLUEGEL     3,513,468

OUTPUT LOGIC FOR DIRECT DIGITAL CONTROL SYSTEM

Filed May 29, 1967     4 Sheets-Sheet 2

INVENTOR.
D. A. FLUEGEL

BY Young & Quigg

ATTORNEYS

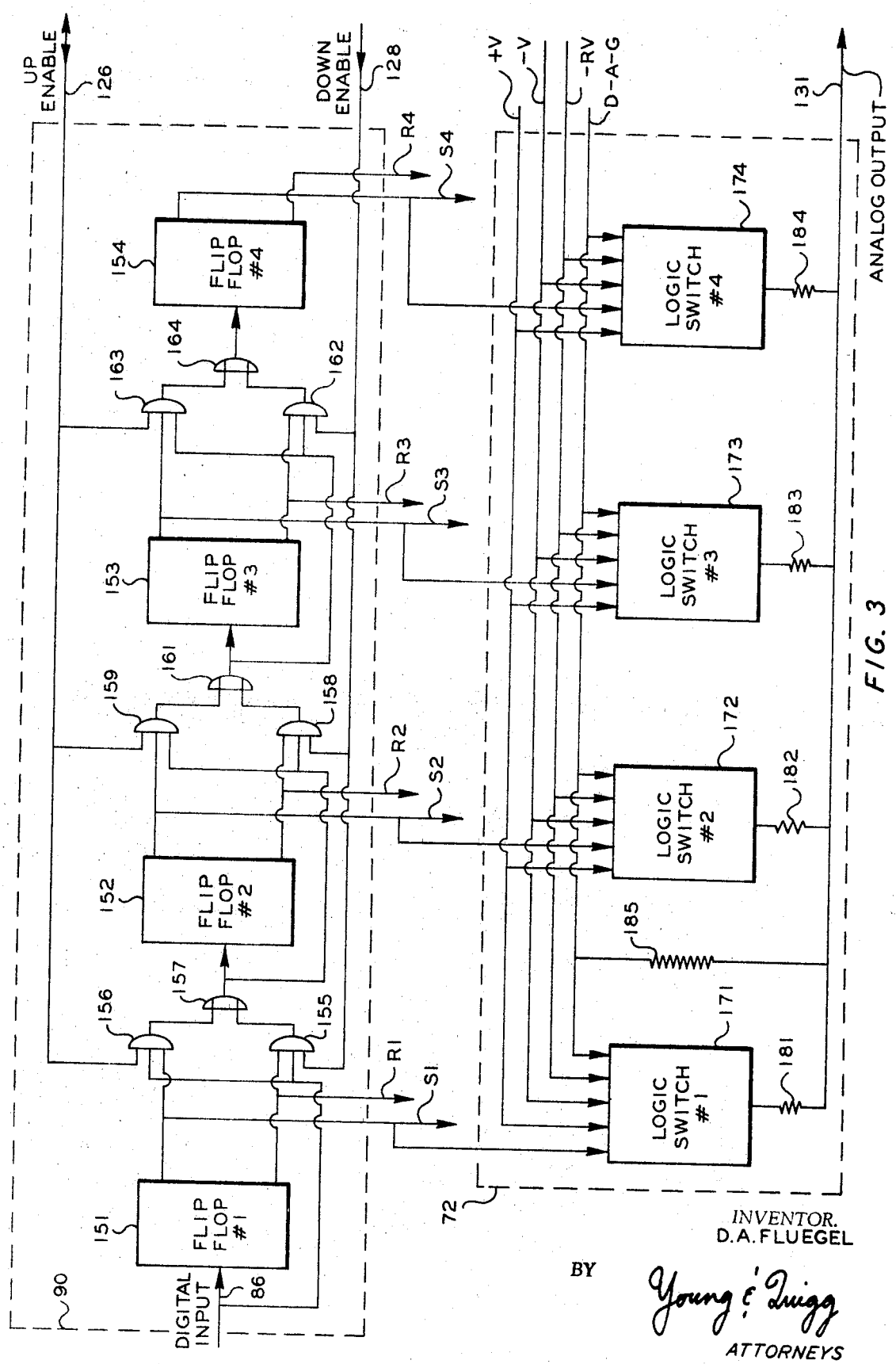

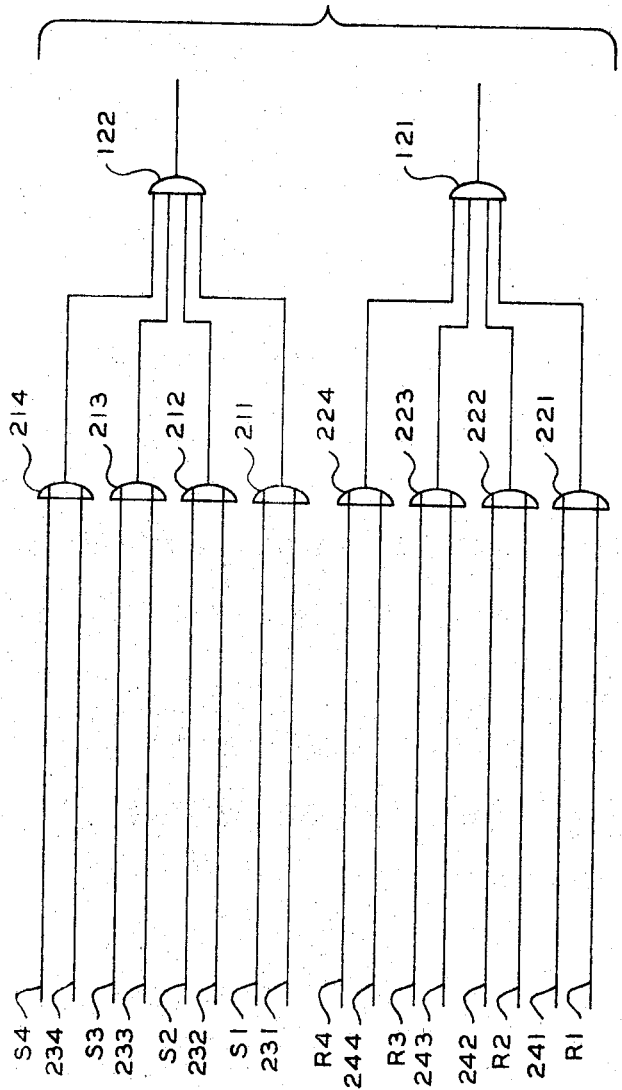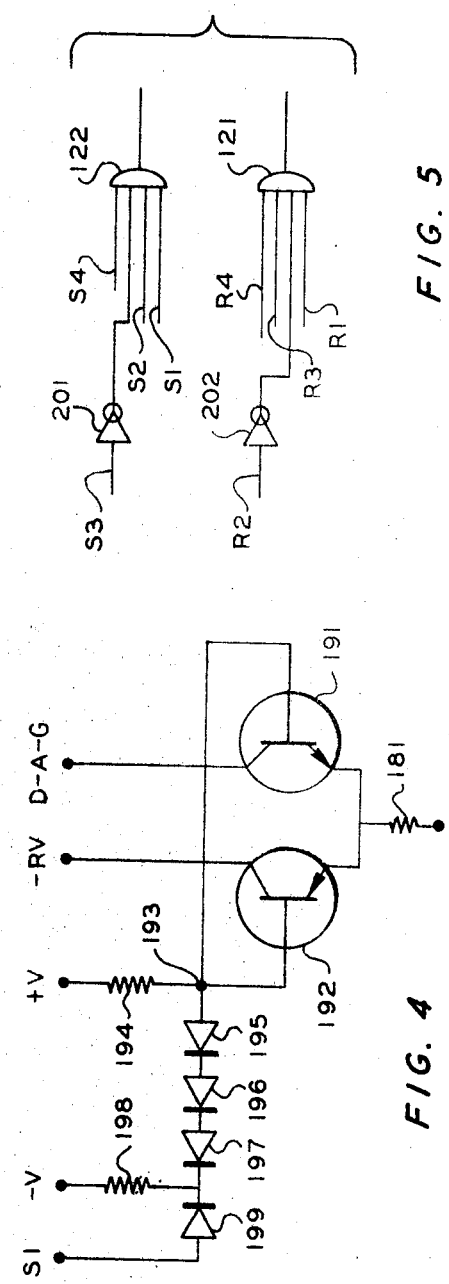

United States Patent Office 3,513,468
Patented May 19, 1970

3,513,468
OUTPUT LOGIC FOR DIRECT DIGITAL CONTROL SYSTEM
Dale A. Fluegel, Bartlesville, Okla., assignor to Phillips Petroleum Company, a corporation of Delaware
Filed May 29, 1967, Ser. No. 641,814
Int. Cl. H03k *13/14*
U.S. Cl. 340—347                    8 Claims

ABSTRACT OF THE DISCLOSURE

An up-down counter is provided with an upper limit gating means and a lower limit gating means to prevent the output signal from going from maximum count to minimum count on adding a pulse or from minimum count to maximum count on subtracting a pulse. This counting system can be utilized in a direct digital control system in combination with a resistance ladder network to form a digital to analog converter. Gating means can be provided to permit either automatic or manual actuation of the converter and its associated control elements.

BACKGROUND OF THE INVENTION

This invention relates to electronic counters. In one aspect the invention relates to up-down counters. In a further aspect the invention relates to a digital-to-analog converter utilizing an up-down electronic counter with an upper limit gate and/or a lower limit gate. In a specific aspect the invention relates to direct digital computer control of a process. In direct digital control (DDC) of a process, a logic system is utilized to provide communication between the digital process control computer and the control elements on the process variables being manipulated. Many of these logic systems utilize counters to store the control signal which is applied to the control element. Up-down counters are useful as the storage counter. However, where the capacity of the counter does not significantly exceed the maximum possible control signal, the counter can register the maximum count and the next pulse will change the counter to the minimum count, normally zero. This results in the control element being actuated in a manner directly opposite that desired, for example a valve in a process line going from a fully open position to a fully closed position when it is desired to hold the valve at the fully open position. Similarly, in a count down operation the counter can reach minimum count and the next pulse will cause the counter to register the maximum count.

Accordingly, it is an object of the invention to provide a new and improved counter. It is an object of the invention to provide an improved up-down counter for utilization in a digital to analog converter. Another object of the invention is to provide an improved DDC system. An object of the invention is to avoid erroneously changing full scale DDC signals to minimum scale signals or minimum scale signals to full scale signals. Other objects, aspects and advantages of the invention will be apparent from a study of the specification, the drawing and the appended claims to the invention.

In accordance with the invention an upper count limit gate is provided to retain the upper limit count on the counter when the input signal exceeds this value. A lower count limit gate is provided to retain the lower limit count on the count if the input signal to the counter on a down count operation exceeds the original stored value. Gating means are provided to permit the actuation of the counter by the digital process control computer or by the manual operator.

BRIEF DESCRIPTION OF THE DRAWINGS

FIG. 3 is a schematic representation of the up-down counter and analog-to-digital converter of FIG. 2; FIG. 4 is a schematic representation of one of the logic switches of FIG. 3; FIG. 5 is a schematic representation of a modification of the limit gates of FIG. 2; and FIG. 6 is a schematic representation of a second modification of the limit gates of FIG. 2.

DESCRIPTION OF THE PREFERRED EMBODIMENT

Figure 1:
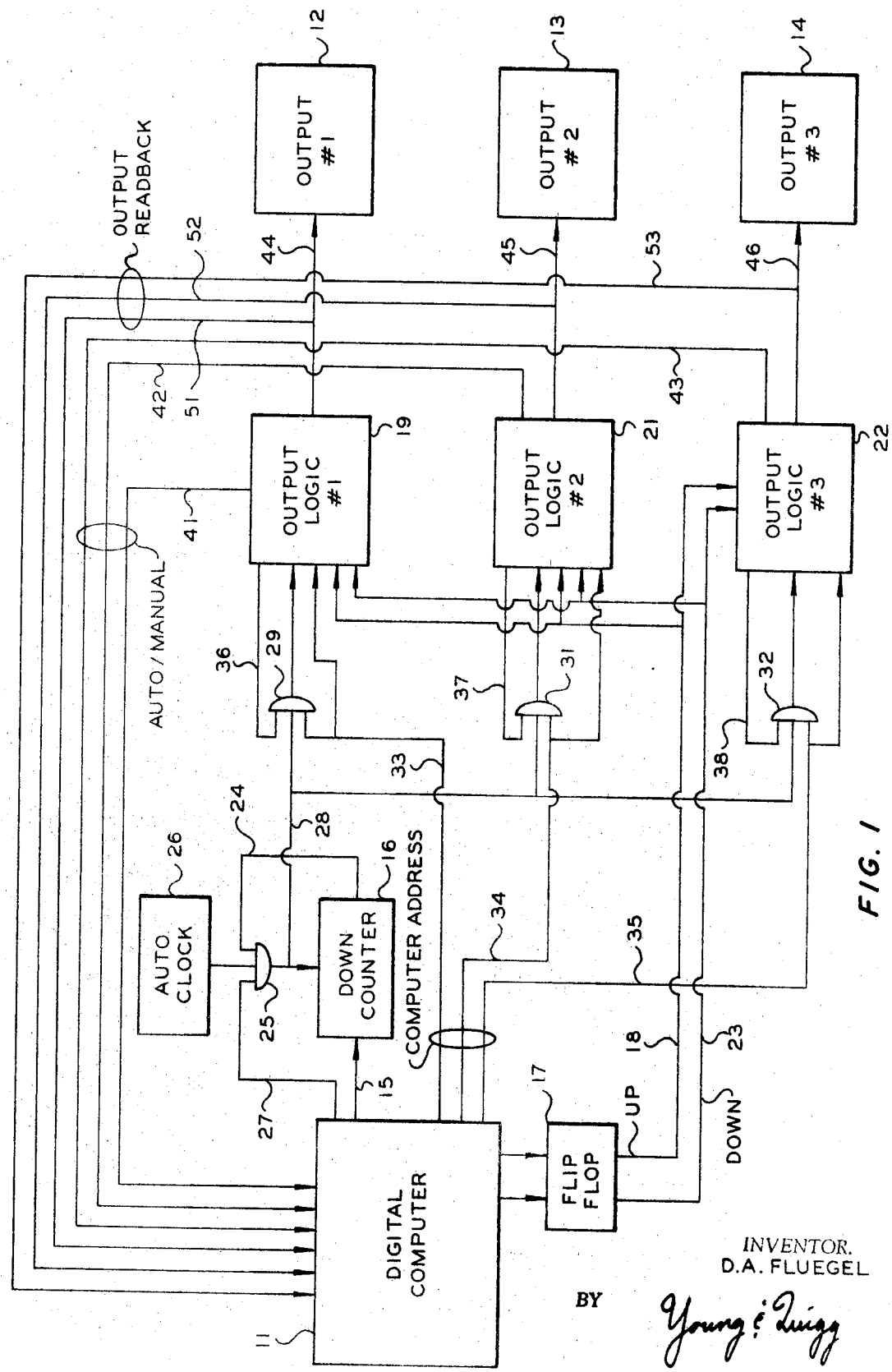
FIG. 1 is a diagrammatic representation of a direct digital computer control system in accordance with the invention.

Referring now to the drawing and to FIG. 1 in particular, digital process computer 11 is employed for the purpose of sequentially updating the control signals to a series of outputs 12, 13 and 14. The digital output of computer 11 representative of the magnitude of a change to be made in the control signal to one of outputs 12, 13 and 14 is applied by cable 15 to down counter 16 to preset each stage of down counter 16 so that the resulting count is representative of the desired change. The sign of the desired change is indicated by computer 11 actuating flip flop 17 to provide either an "up" signal or a "down" signal. The "up" output 18 of flip flop 17 is connected to an input of each of output logic units 19, 21 and 22. The "down" output 23 of flip flop 18 is also connected to an input of each of output logic units 19, 21 and 22. When counter 16 is preset by computer 11, it produces a "not zero" signal which is applied by line 24 to an input of "and" circuit 25. As will be described in terms of the up-down counter of the output logic units, this "not zero" signal can be produced by applying the binary zero (false) output of each stage of down counter 16 to an "and" circuit and passing the output of the "and" circuit through an inverter to produce a binary one (true) signal only when each of the stages of down counter 16 is registering a binary zero signal. The output of an automatic clock 26 is applied to a second input of "and" circuit 25. Clock 26 produces true pulses at a suitable rate, for example, 60 kilocycles per second. When down counter 16 has been preset by computer 11 and computer 11 is ready for the read out operation, a true signal is applied by computer 11 along line 27 to a third input of "and" circuit 25 to gate "and" circuit 25 to pass the output of automatic clock 26. The output of "and" circuit 25 is applied through line 28 to an input of each of "and" circuits 29, 31 and 32. Computer 11 produces an address signal which is applied through one of lines 33, 34 and 35 to the respective "and" circuit 29, 31 or 32, and to the respective output logic unit 19, 21 or 22. When output logic units 19, 21 and 22 are in automatic mode, a true signal is applied through lines 36, 37 and 38 to an input of the respective "and" circuit 29, 31 or 32. Thus if output logic unit 19 is in the automatic mode and an address signal is applied through line 33, "and" circuit 29 is gated to pass the output of "and" circuit 25 to an input of output logic unit 19. Output logic units 19, 21 and 22 produce an auto-manual mode signal which is passed through line 41, 42 or 43, respectively, to computer 11 to indicate to the computer 11 whether the respective output logic unit is in the manual operation mode or the automatic operation mode. The outputs of output logic units 19, 21 and 22 are applied through lines 44, 45 and 46 to outputs 12, 13 and 14, respectively, and through lines 51, 52 and 53, respectively, to computer 11 as output readback signals.

Figure 2:
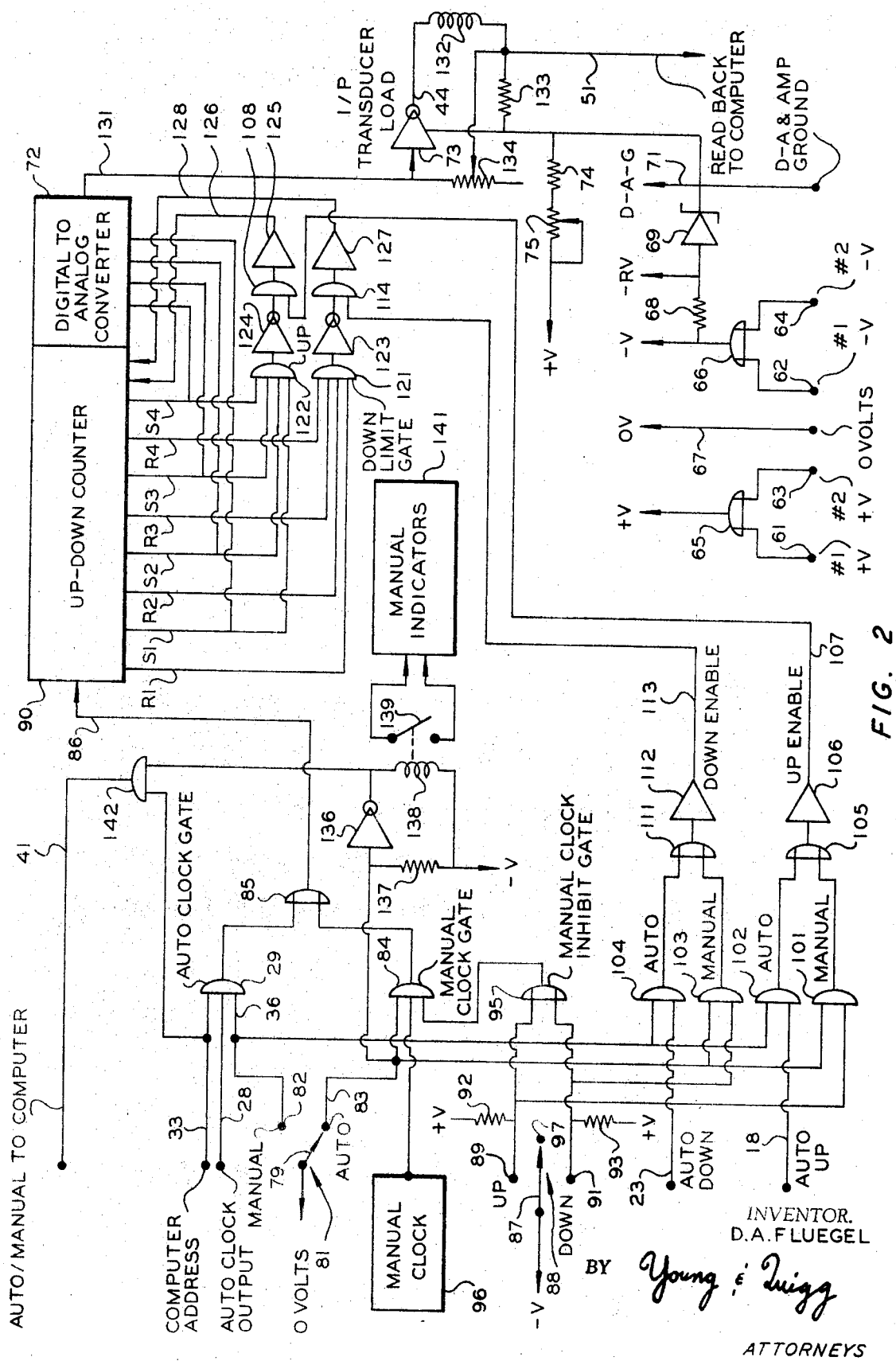
FIG. 2 is a schematic representation of one of the output logic units of FIG. 1.

Referring now to FIG. 2, there is illustrated the details of output logic unit 19, which are also representative of the output logic units 21 and 22. Two positive D.C. power supplies are connected to terminals 61 and 63 respectively, while two negative D.C. power supplies are connected to terminals 62 and 64 respectively. Positive terminals 61 and 63 are connected to respective inputs of "or" circuit 65. Similarly negative terminals 62 and 64 are connected to respective inputs of "or" circuit 66. The first positive supply will generally have a voltage greater than the voltage of the second positive power supply by about 20 to 30 millivolts, so that the "or" circuit 65 passes the voltage of the first positive power supply. Similarly "or" circuit 66 passes the higher voltage of the first negative power supply. However, if for any reason the voltage of either of the first power supplies drops below that of the corresponding second power supply, the respective one of "or" circuits 65 and 66 will pass the voltage of the second power supply instead of the first power supply. This provides an automatic means for replacing the first power supply when it becomes insufficient to supply the desired voltage. The outputs of "or" circuits 65 and 66 provide suitable values of positive and negative D.C. voltage, respectively, for example +12 VDC and —12 VDC.

Logic ground or zero voltage is represented by line 67. A resistor 68 and a Zener diode 69 are connected in series between the output of "or" circuit 66 and terminal 71. The junction between resistor 68 and Zener diode 69 provides a suitable value of reference voltage, —RV, for example, —5.1 VDC. Terminal 71 serves as the ground for the digital-to-analog converter 72 and the amplifier 73. A resistor 74 and a variable resistor 75 are connected in series between terminal 71 and the output of "or" circuit 65 to provide a zero adjustment for the long lead length between terminal 71 and the positive side of the power supply.

The contactor 79 of switch 81 is connected to zero voltage lead 67, while "manual" terminal 82 of switch 81 is connected through lead 36 to an input of "and" circuit 29 which serves as the auto clock gate. If the contactor of switch 81 is on terminal 82, a zero voltage (false) blocking signal is applied through lead 36 to turn "and" circuit 29 off. If the contactor of switch 81 is on "automatic" terminal 83 instead of terminal 82, the blocking signal is applied to manual clock gate "and" circuit 84 instead of auto clock gate "and" circuit 29. The output of "and" circuit 29 is connected to a first input of "or" circuit 85, while the output of "and" circuit 84 is connected to a second input of "or" circuit 85. The output of "or" circuit 85 is connected through lead 86 to an input of up-down counter 90.

The contactor 87 of switch 88 is connected to the negative voltage output of "or" circuit 66, while "up" terminal 89 and "down" terminal 91 of switch 88 are connected to the positive voltage output of "or" circuit 65 through resistors 92 and 93, respectively. Terminals 89 and 91 are also connected to respective inputs of "or" circuit 95, the output of which is connected to an input of "and" circuit 84. A manual clock 96, which produces a timed series of pulses, for example, 60 c.p.s., is connected to a third input of "and" gate 84. "Or" gate 95 serves as a manual clock inhibit gate to pass a blocking (false) signal to "and" circuit 84 if contactor 87 is not on either "up" terminal 89 or "down" terminal 91. This is done so that a transient or transients generated by operation of switch 81 cannot enter even one pulse to the up-down counter 90 via the gate 84. The blocking signal is eliminated when contactor 87 is on neutral terminal 97. Thus switch 81 is manually actuable by the operator between "manual" terminal 82 to block "and" circuit 29 and "automatic" terminal 83 to block "and" circuit 84. When the contactor 79 is on terminal 83 and a computer address is on lead 28, "and" circuit 29 will pass the output pulses of auto clock 26 transmitted by "and" circuit 25, through "or" circuit 85 to the up-down counter 90. When contactor 79 is on terminal 82, "and" circuit 84 is enabled. The operator manually actuates contactor 87 to either terminal 89 or terminal 91 to provide an output from "or" circuit 95 to gate "and" circuit 84 to pass the output pulses from manual clock 96 through "or" circuit 85 to up-down counter 90. The magnitude of a manual correction is represented by the number of pulses from manual clock 96 which are passed by "and" circuit 84, which is determined by the length of time the operator holds contactor 87 on either terminal 89 or terminal 91. The direction or polarity of the manual correction is determined by whether the operator moves contactor 87 to "up" terminal 89 or "down" terminal 91. "Manual up" terminal 89 is connected to a first input of "and" circuit 101, while the "auto up signal" on lead 18 is applied to a first input of "and" circuit 102. "Manual down" terminal 91 is connected to a first input of "and" circuit 103, and the "auto down" signal on lead 23 is applied to a first input of "and" circuit 104. "Auto" terminal 83 of switch 81 is connected to the second inputs of "and" circuits 101 and 103 to block these "and" circuits and thus block the "manual up" or "manual down" signals when contactor 79 is on terminal 83. Similarly, "manual" terminal 82 is connected to the second inputs of "and" circuits 102 and 104 to block these "and" circuits and thus block the "auto up" or "auto down" signals when contactor 79 is on terminal 82. The outputs of "and" circuits 101 and 102 are connected to respective inputs of "or" circuit 105, the output of which is applied to the input of a non-inverting driver 106 to produce an "up enable" signal which is applied through lead 107 to a first input of "and" circuit 108. The outputs of "and" circuits 103 and 104 are applied to the respective inputs of "or" circuit 111, the output of which is applied to the input of a non-inverting driver 112 to produce a "down enable" signal which is applied through lead 113 to a first input of "and" circuit 114.

Each stage of up-down counter 90 produces either a "set" signal (true or binary 1) or a "reset" signal (false or binary zero). In the embodiment illustrated in the drawings counter 90 has four stages and the respective "set" and "reset" signals are designated S1, R1, S2, R2, S3, R3, S4 and R4. Each of R1, R2, R3 and R4 is connected to a respective input of down limit gate "and" circuit 121. Each of S1, S2, S3 and S4 is connected to a respective input of up limit gate "and" circuit 122. Thus "and" circuit 121 produces an output signal only when all four stages of counter 90 are producing "reset" signals, i.e., the count on counter 90 is 0000. "And" circuit 122 produces an output signal only when all four stages of counter 90 are producing "set" signals, i.e., the count on counter 90 is the maximum of 1111. The outputs of "and" circuits 121 and 122 are applied to the inputs of inverting drivers 123 and 124, respectively. The outputs of drivers 123 and 124 are applied to the second inputs of "and" circuits 114 and 108, respectively. Drivers 123 and 124 produce true signals only when the output of the respective one of "and" circuits 121 and 123 is false. Accordingly when an "up enable" signal is present on line 107, "and" circuit 108 will pass the "up enable" signal through non-inverting driver 125 and lead 126 to an input of counter 90 until such time as the count on counter 90 reaches 1111, causing "and" circuit 122 to produce a true output, resulting in the output of driver 124 becoming false to block "and" circuit 108. The count on counter 90 will then remain at 1111 until the counter 90 is instructed to count downwardly. If the "up enable" signal were passed directly to counter 90 without utilizing the up limit gate 122, the next pulse received by counter 90, if the "up enable" signal were still present, would cause the count to go to 0000. The "and" circuit 114 will pass any "down enable" signal through non-inverting driver 127 and lead 128 to counter 90 until such time as the count on counter 90 reaches 0000, causing "and" circuit 121 to produce a true output and driver 123 to produce a false output to block "and"

circuit 114. If the "down enable" signal were applied directly to counter 90 without utilizing down limit gate 121, the next pulse received by counter 90, if the "down enable" signal were still present, would change the count from 0000 to 1111. Thus up limit gate 122 and down limit gate 121 prevent the counter being driven to a limit and then having the next pulse change the counter to the opposite limit. In the control of a valve in a process, this prevents a small change in value of the signal from driving the valve from fully opened to fully closed or from fully closed to fully opened.

The "set" signals, S1, S2, S3 and S4, are applied to the respective inputs of digital to analog converter 72. The analog output of converter 72 is applied through lead 131 to an input of amplifier 73, which is an inverting driver. The output of amplifier 73 is connected through lead 44, I/P transducer load coil 132 and resistor 133 to terminal 71. Read back lead 51 is connected to the junction between resistor 133 and coil 132 to transmit the voltage across resistor 133 to computer 11. A current feedback network for amplifier 73 is provided by variable resistor 134 connected between the junction of coil 132 and resistor 133 and an input of amplifier 73.

An input of inverting driver 136 is connected to terminal 83 of switch 81 and through resistor 137 to the negative voltage output of "or" circuit 66. Relay coil 138 is connected between an output of driver 136 and the output of "or" circuit 66 for the operation of switch 139 to actuate manual indicators 141 when the contactor 79 of switch 81 is on "manual" terminal 82. The output of driver 136 is applied to a first input of "and" circuit 142. The second input of "and" circuit 142 is connected to computer address signal lead 33. The output of "and" circuit 142 is connected through lead 41 to computer 11 to inform computer 11, when questioned by computer 11, whether the particular output logic unit is in manual mode or automatic mode.

Referring now to FIG. 3, the details of up-down counter 90 and digital-to-analog converter 72 are illustrated. Counter 90 contains flip flop circuits 151, 152, 153 and 154 to provide four stages. The digital input on lead 86 is applied to an input of flip flop 151 and to a first input of each of "and" circuits 155 and 156. The set output S1 of flip flop 151 is applied to a second input of "and" circuit 156 while the reset output R1 is applied to a second input of "and" circuit 155. The "up enable" lead 126 is connected to a third input of "and" circuit 156, and the "down enable" lead 128 is connected to a third input of "and" circuit 155. The outputs of "and" circuits 155 and 156 are connected to respective inputs of "or" circuit 157, the output of which is connected to an input of flip flop 152 and to first inputs of "and" circuits 158 and 159. The set output S2 and the reset output R2 of flip flop 152 are connected to the second inputs of "and" circuits 159 and 158, respectively. The "up enable" lead 126 and the "down enable" lead 128 are connected to the third inputs of "and" circuits 159 and 158. The outputs of "and" circuits 158 and 159 are connected to respective inputs of "or" circuit 161, the output of which is connected to an input of flip flop 153 and the first inputs of "and" circuits 162 and 163. S3 and R3 are connected to the second inputs of "and" circuits 163 and 162, respectively. The "up enable" lead 126 and the "down enable" lead 128 are connected to the third inputs of "and" circuits 163 and 162, respectively. The outputs of "and" circuits 162 and 163 are connected to respective inputs of "or" circuit 164, the output of which is connected to an input of flip flop 154. The operation of an up-down counter is well known to those skilled in the art, and will be omitted for the sake of conciseness.

The set output signals S1, S2, S3 and S4 and the reset output signals R1, R2, R3 and R4 are connected to the inputs of "and" circuits 122 and 121, respectively, as shown in FIG. 2. Each of the set output signals S1, S2, S3 and S4 is also connected to an input of the respective one of logic switches 171, 172, 173 and 174 of converter 72. The positive voltage, +V, output of "or" circuit 65; the negative voltage, −V, output of "or" circuit 66; the reference voltage −RV at the junction of resistor 68 and Zener diode 69; and the digital-to-analog converter and amplifier ground, D-A-G; are connected to respective terminals of each of logic switches 171, 172, 173 and 174. Weighted output resistors 181, 182, 183 and 184 are connected between the respective output of logic switches 171, 172, 173 and 174 and analog output lead 131. A scaling resistor 185 is connected between lead 131 and D-A-G. Logic switches 171, 172, 173 and 174 connect the upper end of the respective resistors 181, 182, 183 and 184 to the −RV input when the respective set signal, S1, S2, S3 or S4 is present. In the absence of the respective set signal, the upper end of the respective one of resistors 181, 182, 183 and 184 is connected to D-A-G. Resistors are individually weighted so that the application of the −RV voltage thereto causes an analog current in lead 131 equivalent in magnitude to the magnitude of the digital count on counter 90. For example, resistors 181, 182, 183 and 184 could have the ratio to each other, in the order named, of 1:2:4:8.

Referring now to FIG. 4, there are illustrated the details of logic switch 171, which are representative of logic switches 172, 173 and 174. The D-A-G lead is connected to the collector of N-P-N transistor 191, while the −RV lead is connected to the collector of P-N-P transistor 192. The top end of resistor 181 is connected to the emitter of each of transistors 191 and 192. The base of each of transistors 191 and 192 is connected to terminal 193. Terminal 193 is connected through resistor 194 to the +V lead, and through diodes 195, 196 and 197 and resistor 198 in series to the −V lead. The set signal S1 is applied through diode 199 to the junction between resistor 198 and diode 197. In the absence of a signal on the S1 lead, transistor 191 is conducting to connect resistor 181 to DAG, and transistor 192 is non conducting. Upon the application of a signal to the S1 lead, transistor 192 is rendered conducting to connect resistor 181 to −RV, and transistor 191 is rendered non conducting.

Referring now to FIG. 5, there is illustrated a modification of FIGURE 2 for providing an upper limit other than the maximum 1111 of the counter 90 and a lower limit other than the minimum 0000 of the counter 90. An inverting driver 201 is inserted in the S3 lead line to cause "and" circuit 122 to produce a true output when the count on counter 90 reaches 1011. An inverting driver 202 is inserted in the R2 lead line to cause the "and" circuit 121 to produce a true output when the count on counter 90 drops to 0010. It is apparent that any number of inverters can be utilized in any combination in the set signal lead lines and reset signal lead lines to provide any desired upper limit and lower limit.

Referring now to FIG. 6, there is illustrated another modification of FIG. 2 to provide for varying the upper and lower limits. Set signals S1, S2, S3 and S4 are applied as first inputs to "or" circuits 211, 212, 213, and 214, respectively, while reset signals R1, R2, R3 and R4 are applied as first inputs to "or" circuits 221, 222, 223 and 224, respectively. The outputs of "or" circuits 211, 212, 213, and 214 are applied to respective inputs of "and" circuit 122. The outputs of "or" circuits 221, 222, 223, and 224 are applied to respective inputs of "and" circuit 121. Limit control signals 231, 232, 233, 234, 241, 242, 243 and 244 can be applied as second inputs to "or" circuits 211, 212, 213, 214, 221, 222, 223 and 224, respectively. The application of a limit control signal to any of the "or" circuits alters the limit. For example, the application of limit control signal 233 in the absence of signals 231, 232 and 234 would provide an upper limit of 1011, while control signal 232 in the absence of the control signals 231, 233 and 234 would provide an upper limit of 1101. Similarly control signal 242 in the absence of signals 241, 243 and 244 would provide a lower limit of 0010. The limit control signals can be produced by the operator manually closing a switch to connect the respective lead to a voltage source, or by the computer 11 in the response to a detected condition. For example, under some operating conditions it may be desirable to permit the output 44 to vary within a wide range and under other operating conditions it may be desirable to restrict output 44 to a narrow range.

Reasonable variation and modification are possible within the scope of the foregoing disclosure, the drawing and the appended claims to the invention. For example, while counter 90 has been described for sake of simplicity as utilizing four stages, it is apparent that any number of stages can be utilized. While the reset inputs of flip flops 151, 152, 153 and 154 have not been illustrated, reset control can be provided, if desired. While counter 90 has been illustrated as a binary counter, any other type of digital counter and corresponding digital to analog converter can be employed, for example an up-down binary coded decimal counter.

What is claimed is:

1. Apparatus comprising an up-down digital counter having a signal input, an output, an "up enable" terminal and a "down enable" terminal, and containing a plurality of stages, each of said stages having first and second opposite output signals; a source of pulses, means for applying pulses from said source of pulses to said signal input of said digital counter; a first "and" circuit; means for connecting the first output signal of each of said stages to a respective input of said first "and" circuit; a second "and" circuit; means for connecting the second output of each of said stages to a respective input of said second "and" circuit; first and second inverters; third and fourth "and" circuits; means for connecting the output of said first "and" circuit through said first inverter to a first input of said third "and" circuit; means for connecting the output of said second "and" circuit through said second inverter to a first input of said fourth "and" circuit; means for producing an "up enable" signal and for applying said "up enable" signal to a second input of said third "and" circuit; means for producing a "down enable" signal and for applying said "down enable" signal to a second input of said fourth "and" circuit; means connecting the output of said third "and" circuit to said "up enable" terminal of said counter; and means for connecting the output of said fourth "and" circuit to said "down enable" terminal of said counter.

2. Apparatus in accordance with claim 1 further comprising digital-to-analog converting means connected to said output of said digital counter for producing an analog signal having a magnitude representative of the signal at said output of said counter; and means for manipulating a variable responsive to said analog signal.

3. Apparatus in accordance with claim 1 wherein said means for connecting the first output signal of each of said stages to a respective input of said first "and" circuit comprises a first plurality of "or" circuits corresponding in number to the number of said stages, means for connecting each of said first output signals to a first input of a respective one of said first plurality of "or" circuits, and means for connecting the output of each of said first plurality of "or" circuits to a respective input of said first "and" circuit; wherein said means for connecting the second output signal of each of said stages to a respective input of said second "and" circuit comprises a second plurality of "or" circuits corresponding in number to the number of said stages, means for connecting each of said second output signals to a first input of a respective one of said second plurality of "or" circuits, and means for connecting the output of each of said second plurality of "or" circuits to a respective input of said second "and" circuit; means for producing a plurality of limit control signals corresponding in number to the total of said first and second pluralities of "or" circuits and for selectively applying each of said limit control signals to the second input of a respective one of said first and second pluralities of "or" circuits.

4. Apparatus in accordance with claim 1 further comprising digital-to-analog converting means connected to said output of said digital counter for producing an analog signal having a magnitude representative of the signal at said output of said counter; an amplifier; means for applying said analog signal to an input of said amplifier; first and second positive D.C. power supplies and first and second negative power supplies; first and second "or" circuits; means for connecting said first and second positive power supplies to respective inputs of said first "or" circuit; means for connecting said first and second negative power supplies to respective inputs of said second "or" circuit; the voltage of said first positive power supply normally being slightly greater than the voltage of said second positive power supply; the voltage of said first negative power supply normally being slightly greater than the voltage of said second negative power supply, a resistor and a Zener diode connected in series between the output of said second "or" circuit and the ground terminal of said amplifier; and a variable resistor connected between said ground terminal and the output of said first "or" circuit.

5. Apparatus in accordance with claim 1 wherein at least one of said means for connecting the first output signals to a respective input of said first "and" circuit and said means for connecting the second output signals to a respective input of said second "and" circuit comprises at least one means for connecting one of the respective output signals through an inverter to an input of the respective "and" circuit.

6. Apparatus in accordance with claim 1 wherein said source of pulses and said means for applying pulses from said source of pulses to said signal input of said digital counter comprises a digital computer, a high frequency automatic clock for producing high frequency pulses, a down counter, means for initially setting said down counter responsive to an output of said computer, a fifth "and" circuit, means for applying the output pulses from said automatic clock to a first input of said fifth "and" circuit, means responsive to the setting of said down counter for appylying and enabling signal to a second input of said fifth "and" circuit so long as the setting of said down counter exceeds a predetermined value, means responsive to said computer for applying a readout pulse to a third input of said fifth "and" circuit, a sixth "and" circuit, means for applying the output of said fifth "and" circuit to a first input of said sixth "and" circuit, means responsive to said computer for applying an address signal to a second input of said sixth "and" circuit, and means for applying the output of said sixth "and" circuit to said signal input of said digital counter.

7. Apparatus in accordance with claim 6 wherein said source of pulses and said means for applying pulses from said source of pulses to said signal input of said digital counter further comprises a low frequency clock for producing low frequency pulses, a seventh "and" circuit, means for connecting the output of said low frequency clock to a first input of said seventh "and" circuit, means for applying an inhibit signal to an input of said seventh "and" circuit, means for manually discontinuing said inhibit signal, an automatic/manual switch having a manual position and an automatic position, means responsive to said switch being in said manual position for blocking said sixth "and" circuit, means responsive to said switch being in said automatic position for blocking said seventh "and" circuit; said means for applying the output of said sixth "and" circuit to said signal input of said digital counter comprises an "or" circuit having a first input connected to the output of said sixth "and" circuit and a second input connected to the output of said seventh "and" circuit and an output connected to said signal input of said digital counter.

8. Apparatus in accordance with claim 7 wherein said means for producing an "up enable" signal comprises eighth and ninth "and" circuits, means responsive to said computer for applying an auto up signal to a first input of said eighth "and" circuit, manually actuable means for applying a manual up signal to a first input of said ninth "and" circuit, means responsive to said automatic/manual switch being in said manual position for applying a blocking signal to a second input of said eighth "and" circuit, means responsive to said automatic/manual switch being in said automatic position for applying a blocking signal to a second input of said ninth "and" circuit, an "up enable" "or" circuit having first and second inputs connected to the outputs of said eighth and ninth "and" circuits, respectively, and means connecting the output of said "up enable" "or" circuit to said second input of said third "and" circuit; and wherein said means for producing a "down enable" signal comprises tenth and eleventh "and" circuits, means responsive to said computer for applying an auto down signal to a first input of said tenth "and" circuit, manually actuable means for applying a manual down signal to a first input of said eleventh "and" circuit, means responsive to said automatic/manual switch being in said manual position for applying a blocking signal to a second input of said tenth "and" circuit, means responsive to said automatic/manual switch being in said automatic position for applying a blocking signal to a second input of said eleventh "and" circuit, a "down enable" "or" circuit having first and second inputs connected to the outputs of said tenth and eleventh "and" circuits, respectively, and means connecting the output of said "down enable" "or" circuit to said second input of said fourth "and" circuit.

References Cited

UNITED STATES PATENTS

| | | | |
|---|---|---|---|
| 3,017,093 | 1/1962 | Rowley | 235—92 |
| 3,145,292 | 8/1964 | Schwaninger | 235—92 |
| 3,159,792 | 12/1964 | Metz | 307—222 X |
| 3,426,296 | 2/1969 | Christiansen et al. | |

MAYNARD R. WILBUR, Primary Examiner

G. R. EDWARDS, Assistant Examiner

U.S. Cl. X.R.

235—92; 307—222; 328—44